Aug. 28, 1962  S. O. PRATT  3,051,033
BODY SHELL AND SOUNDING BOX STRUCTURE FOR HARPS
Filed May 18, 1959  6 Sheets-Sheet 1
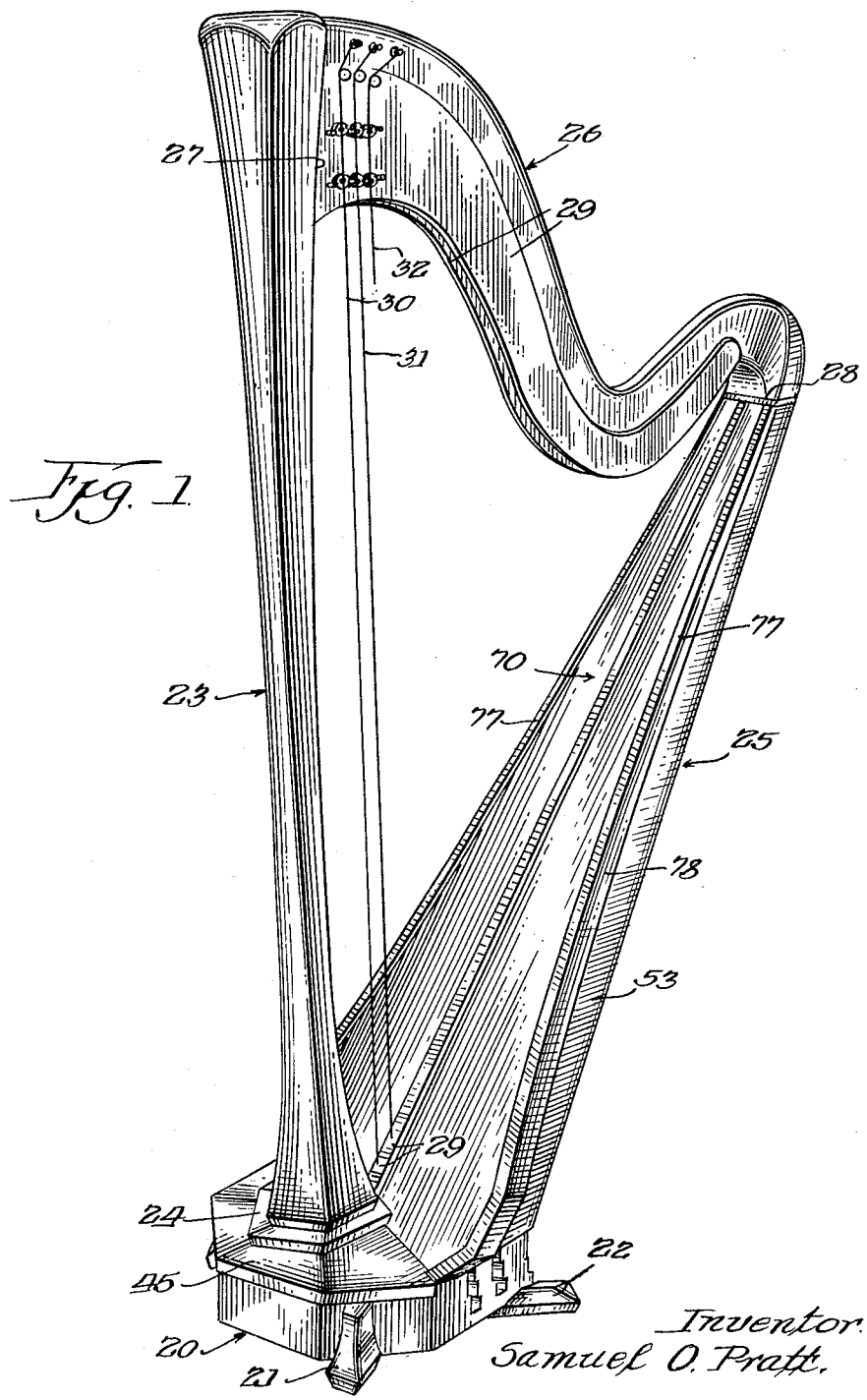

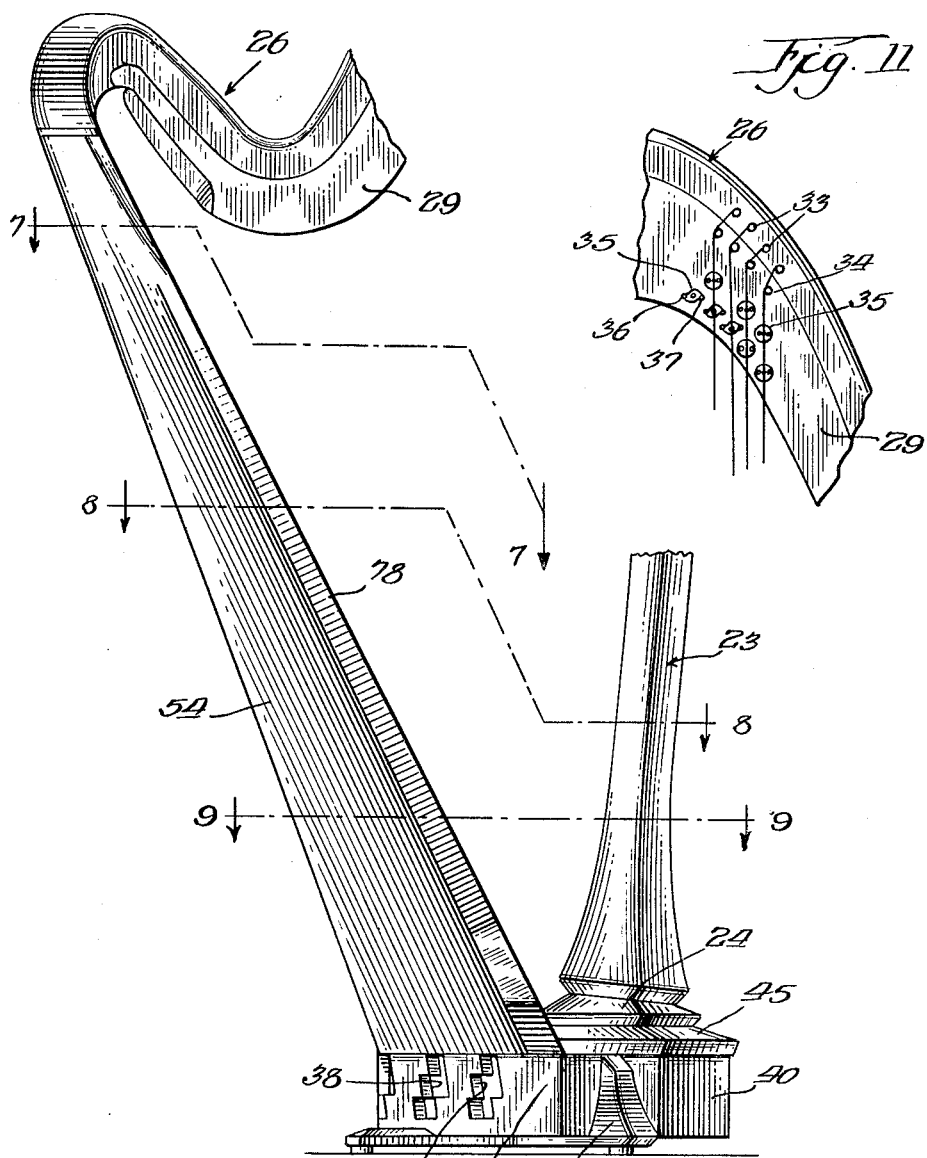

Aug. 28, 1962     S. O. PRATT     3,051,033
BODY SHELL AND SOUNDING BOX STRUCTURE FOR HARPS
Filed May 18, 1959     6 Sheets-Sheet 3
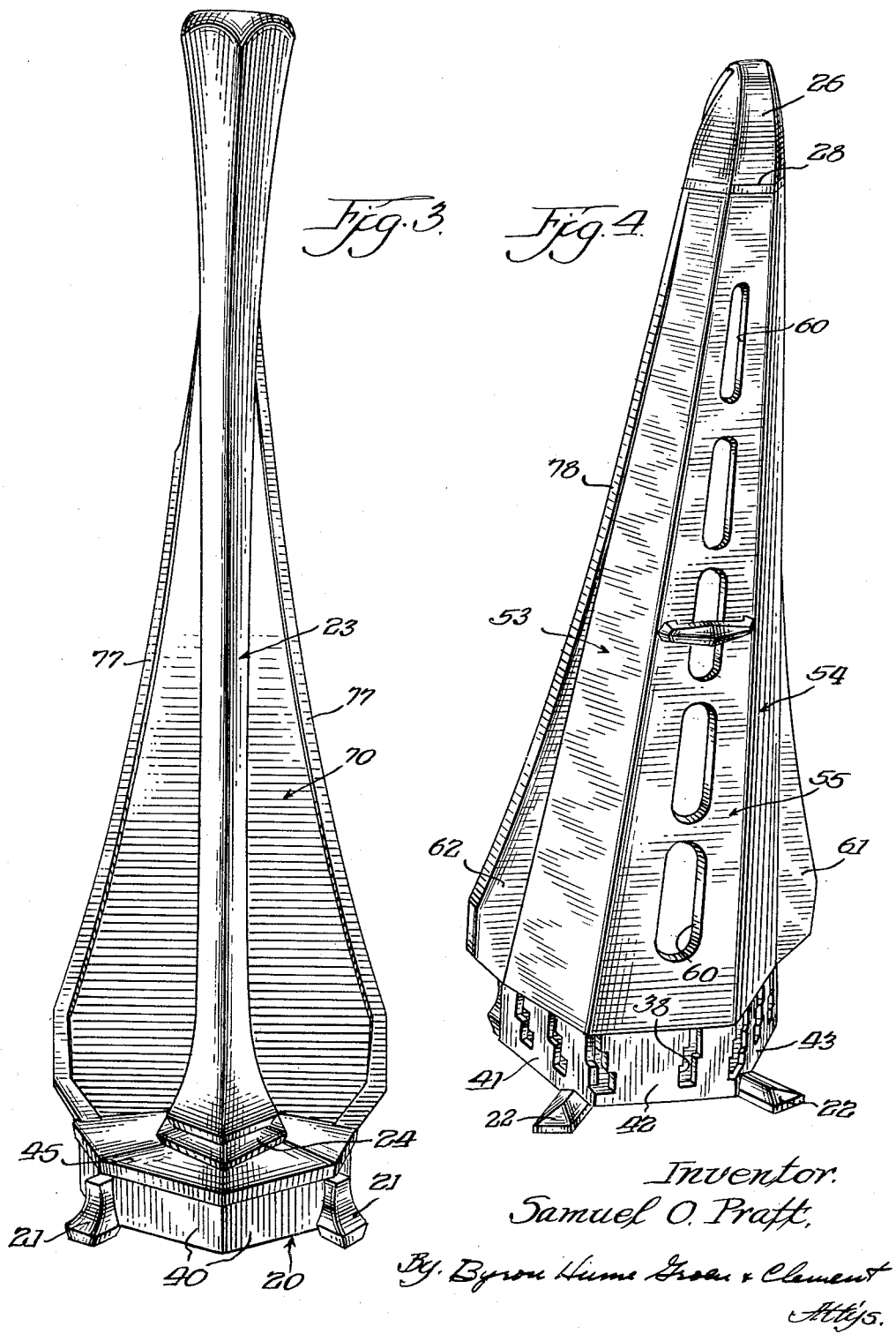
Inventor.
Samuel O. Pratt,
By Byron Hume Groen & Clement
Att'ys.

Aug. 28, 1962 S. O. PRATT 3,051,033
BODY SHELL AND SOUNDING BOX STRUCTURE FOR HARPS
Filed May 18, 1959 6 Sheets-Sheet 4

Inventor.
Samuel O. Pratt.
By Byron Hume Groen & Clement
Attys

Aug. 28, 1962 S. O. PRATT 3,051,033
BODY SHELL AND SOUNDING BOX STRUCTURE FOR HARPS
Filed May 18, 1959 6 Sheets-Sheet 5
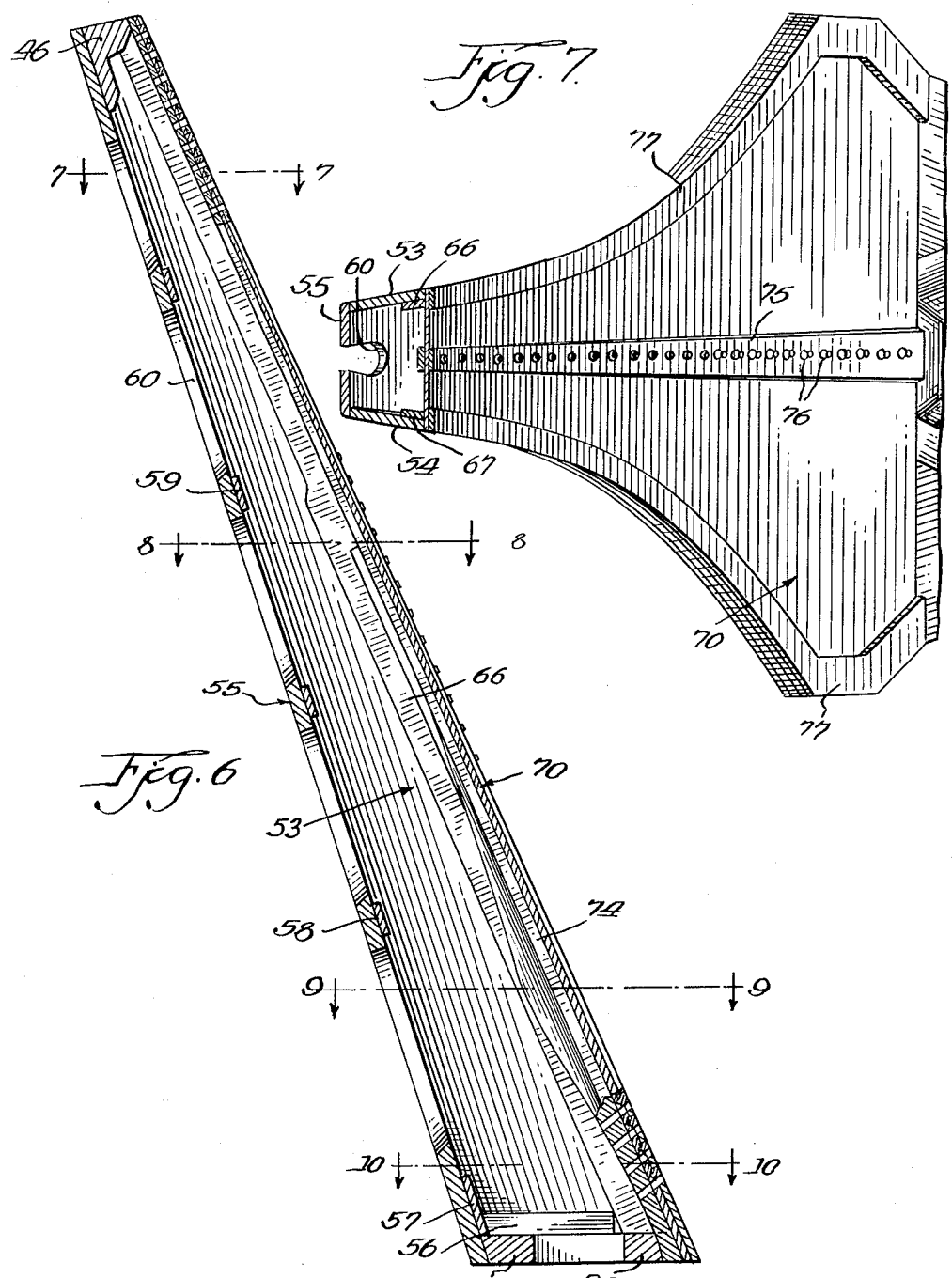

Aug. 28, 1962 S. O. PRATT 3,051,033
BODY SHELL AND SOUNDING BOX STRUCTURE FOR HARPS
Filed May 18, 1959 6 Sheets-Sheet 6

Inventor.
Samuel O. Pratt.
By Byron Hume Groen & Clement
Attys.

United States Patent Office 3,051,033
Patented Aug. 28, 1962

3,051,033
BODY SHELL AND SOUNDING BOX
STRUCTURE FOR HARPS
Samuel O. Pratt, Chicago, Ill., assignor to Lyon & Healy, Inc., Chicago, Ill., a corporation of Illinois
Filed May 18, 1959, Ser. No. 813,793
9 Claims. (Cl. 84—265)

The invention relates to musical instruments and has reference in particular to new and novel improvements in sounding box structure for harps.

As heretofore constructed the harp has always incorporated a sounding box essentially consisting of a rear wall member of arcuate formation substantially semi-circular in extent and to which is secured the conventional sounding board. The sounding board provides a front facing member for the sounding box and the strings at one end thereof are anchored to the member. The present invention has for its main objective to improve the sounding box structure of harps by providing a structure which will not only be distinctive and attractive in over-all appearance, but which will have certain functional attributes contributing to its improved performance in producing tones of better quality and of truer pitch.

Another object of the invention resides in providing sounding box structure for harps wherein all of the parts comprising the said structure will be flat throughout their extent so as to facilitate their vibrating action and which in the aggregate will materially improve the resonance of the device.

Another object of the invention is to improve the sounding box structure of harps as heretofore manufactured by eliminating the semi-circular rear wall member and by substituting in its place a radically new arrangement of flat panels and which in the preferred embodiment are combined with complemental wing members. The improved panel arrangement includes a rear panel and respective side panels and when said panels are secured to each other and assembled with a sounding board the structure produces a new and novel sounding box having improved resonance and better tone quality.

A more specific object of the invention resides in the provision of an improved sounding box particularly designed for harps and characterized by structure formed of side and rear panels and by wing members having a unique combination with the panels, the said panels and wing members being flat throughout their extent and being arranged with the sounding box so as to form a resonating chamber capable of intensifying and enriching the tones of the harp by its improved vibrating action.

The invention contemplates that the side and rear panels in combination with the sounding board will produce a chamber approximately square in cross section and which will increase gradually in area towards the base. Thus the sounding box is tapered in shape and the panels, wing members and sounding board comprising the same are also tapered longitudinally so as to provide varying dimensions for producing points of resonance for any length of sound wave. It should also be understood that by adding the wing members to the sounding box structure, the sounding board has a maximum width adjacent its lower end for better vibrating action.

A further object is to provide sounding box structure for use in constructing the frame of a harp and which will be relatively simple in design, although attractive and modern in appearance, which can be conveniently manufactured since all of the parts can be produced from flat boards and which will require only the conventional operations of cutting, finishing and gluing for assembling the parts to form the completed frame element.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

FIGURE 1 is a perspective view of a harp embodying the improved sounding box structure of the present invention, the same showing the exposed front face of the sounding board;

FIGURE 2 is a fragmentary view of the harp as shown in FIGURE 1, the same illustrating in side elevation the sounding box structure of the invention;

FIGURE 3 is a front elevational view of the harp as shown in FIGURE 1;

FIGURE 4 is a perspective view of the rear of the sounding box, the same showing the panel arrangement with the wing members in combination therewith;

FIGURE 6 is a longitudinal sectional view taken approximately on line 6—6 of the sounding box structure as shown in FIGURE 5 and showing the tapering shape of the same and also the longitudinal taper of the various parts comprising the box;

FIGURE 7 is a cross sectional view of the sounding box taken approximately along line 7—7 of FIGURES 2 and 6;

FIGURE 11 is a fragmentary detail view in side elevation showing a portion of the neck of the harp with the strings attached.

Figures 5, 10:
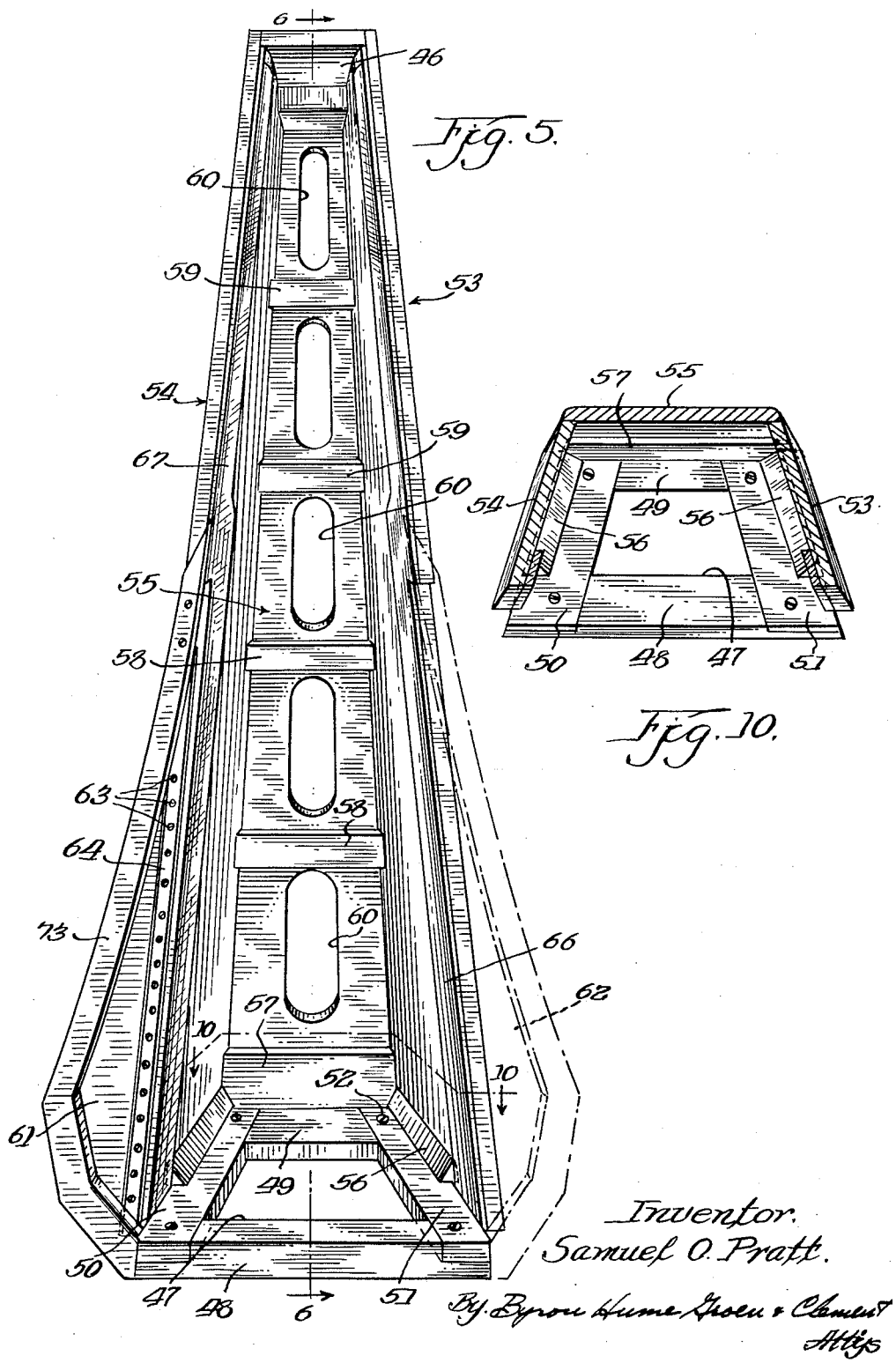
FIGURE 5 is a front elevational view of the present sounding box structure, with the sounding board removed to better illustrate the interior construction of the box.
FIGURE 10 is a cross sectional view taken approximately along line 10—10 of FIGURES 5 and 6 and showing the fabricated base member of the sounding box.
Figure 8:
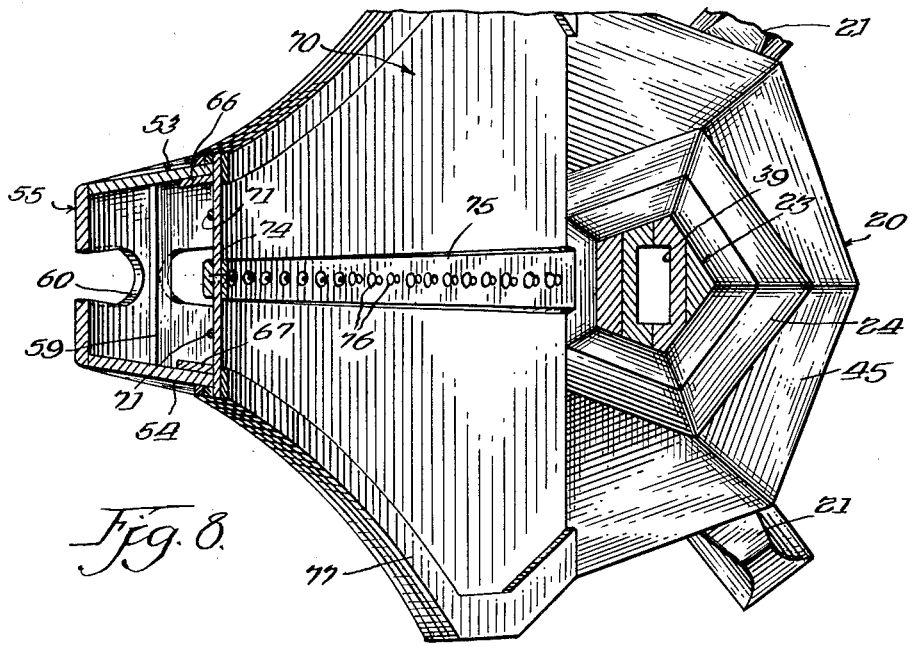
FIGURE 8 is a cross sectional view of the sounding box taken approximately along line 8—8 of FIGURES 2 and 6.
Figure 9:
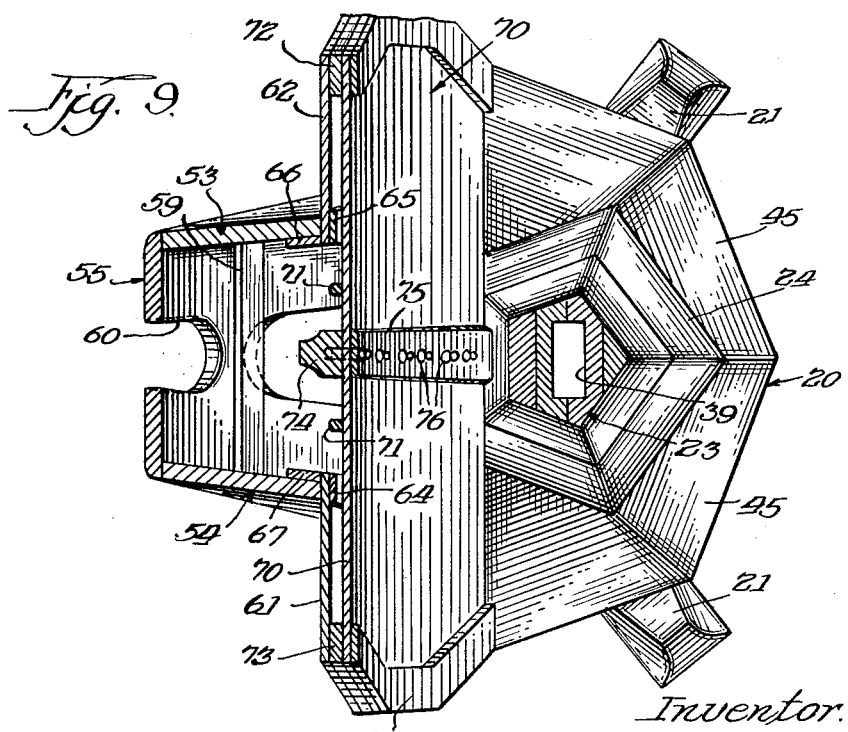
FIGURE 9 is a cross sectional view taken approximately along line 9—9 of FIGURES 2 and 6.

The harp selected for illustrating the improvements of the invention is best illustrated in front perspective in FIGURE 1, the same essentially including a base member 20, a vertical column 23, the sounding box designated in its entirety by numeral 25 and the neck 26. The base 20 is provided with front feet 21 and with rear feet 22. The column 23 is supported on the base by the column block 24 and the neck 26 has connecting relation at 27 with said column and at 28 with the sounding box. The action mechanism of the harp is supported and mounted between the metal plates 29 which depend from the neck 26, being supported thereby in spaced relation and which complete the neck structure. Details of the action mechanism are not shown since said mechanism forms no part of the present invention. It is sufficient to understand that the strings of the harp such as 30, 31 and 32 are anchored at their lower ends as at 29, to the sounding board of the harp, and said strings at their upper ends are fixed to the neck 26 (FIGURE 11) by means of the tuning pins 33. The pins 33 can be rotated for tuning the strings and said strings in advance of the pins are purposely caused to engage the stationary nuts 34 which determine the maximum length of the strings. It is customary in tuning harps to tune the strings in the flat. The natural notes and also the sharps are obtained by shortening the length of the strings and which is accomplished by rotatable disks 35 journalled for rotation in the depending metal plates 29. Each of the disks 35 is provided with a pair of spaced pins 36 and 37 disposed on opposite sides of its respective string, and, depending on the extent of rotation of the disks, the pins can be caused to engage the strings at different elevations to decrease their effective vibrating length. In this manner the disks are caused to so engage the strings as to produce a natural tone or to produce a tone which is one-half note higher than the natural for its respective string and which is termed a sharp. The disks are rotated by the operator in a manner which is conventional in harp construction, the same including pedals (not shown) which project through openings 38 formed in the base member of the harp. The pedals have connection with the action mechanism located between the plates 29 by means of pedal rods which operate within tubes extending the length of the column 23. For this purpose the column is hollow as shown in FIGURES 8 and 9, the column having a passage 39 extending longitudinally of the same and the tubes have location within the passage.

The base 20 is a built-up structure which is a heptagon in plan elevation having seven sides, four of which are located forwardly of the sounding board whereas the remaining three sides are located rearwardly of the sounding board, and to which are secured the three panels of the sounding box. Accordingly, those members which constitute the rim of the base such as 40 and which are located in front of the sounding board, do not have any pedal openings formed therein. However, the front feet 21 are fixed to and the same extend outwardly from certain of the members 40 as shown in FIGURE 1. The pedal openings 38 are formed in each of the rear members 41, 42 and 43 of the base rim. In addition to said openings, the rear feet 22 extend outwardly from the said members to complete the supporting elements for the harp. The base boards 45 are associated with the side members 40 in a manner to close this top portion of the base and the said boards, in turn have the column block 24 positioned thereon and to which the column 23 is secured. Said base boards 45 and the column block 24 add to the decorative appearance of the harp and, as best illustrated in FIGURE 2, the column is supported on the column block 24 so as to have a slight tilt in a forward direction.

The manner in which the neck 26 of the harp is connected to the column 23 at its uper end is conventional as is also the connection between the neck and the sounding box. However, at this connecting point it will be understood that the cross-sectional area of the box is a minimum. Also to assist in the joint between the box and the neck, the said sounding box at its upper end is provided with block 46, FIGURE 6. Accordingly, the sounding box 25 tapers in a longitudinal direction from its maximum size adjacent the base 20 to a minimum cross sectional area at the connecting point 28 between the box and the neck. The various parts of the sounding box also taper longitudinally so that varying dimensions are provided for producing points of resonance for any length of sound wave. Details in the construction of the sounding box will now be described.

Whereas the top body block 46 constitutes a unitary element and of a size to close this end of the box, it will be understood that the bottom body frame 48, 49, 50 and 51 for the box is fabricated of a number of parts and that the same has an opening 47 therein communicating with the interior of the base 20. As best shown in FIGURE 6 the bottom frame element includes front and rear members 48 and 49, respectively, and connecting side members 50 and 51. The members are joined by a dovetailing operation and secured by the screws 52. The sounding box of the invention is essentially formed of three panel members, namely two side panels 53 and 54, FIGURES 4, 7, 8 and 9, and a rear panel 55. The panels at their lower ends are suitably secured to the bottom body frame and at their upper end said panels have suitable securement to the top body block 46. Reinforcing strips such as 56 may be employed to strengthen the connection of the side panels 53 and 54 to the members 50 and 51. Another reinforcing strip in the form of a rib 57 is provided to assist in joining the rear panel 55 to the members 49, 50 and 51 of the bottom body frame. Other ribs 58 and 59 extend transversely of the rear panel to additionally join the same to the side panels, and the rear panel is completed by the provision of openings or ports 60 which are elongated in a longitudinal direction and which are required for the proper functioning of the resonance chamber as formed by the side panels 53—54, the rear panel 55, and the sounding board 70 of the present sounding box. It is desired to note that the panels are flat throughout their extent and an additional feature in accordance with the present inventive concept consists in tapering each panel from a maximum thickness adjacent the bottom body frame to a minimum thickness at the top of the block 46. More particularly, in an actual full size harp, each of the side panels have a length of approximately forty inches and said panels at their base measure approximately three-fourths inch and taper to a thickness of about one-half an inch at the top.

Although the panel arrangement in combination with a sounding board would in itself produce an entirely satisfactory resonance chamber for amplifying the vibration produced by the harp strings, nevertheless the invention contemplates further improvements to the sounding box for particularly amplifying the lower tones of the instrument. This further improvement to the resonance chamber of the present harp resides in the provision of wing structures as best shown in FIGURES 4, 5, 8 and 9. Said wing structures each have a length approximately one-half that of the box, and as illustrated the wing structure begins at the bottom body frame and continues upwardly to terminate approximately centrally of the length of the box. Each wing structure essentially consists of a wing member such as 61 and 62 located on respective sides of the box and projecting laterally from the side panels. More particularly, wing member 61 is secured to side panel 53 by means of the screws 63 and for this purpose a screw strip 64 is provided. In a similar manner the wing member 62 is secured to side panel 54 by screws and a screw strip 65 is provided as shown in FIGURES 8 and 9. With respect to each of the side panels 53 and 54 an inside corner strip, designated by numerals 66 and 67, respectively, is fixed to the panel to further assist in the connection of the wing members to their respective side panels.

The panel arrangement including the wing structure can be considered as forming the body shell of the sounding box and the said shell when combined with the sounding board 70 produces the desired resonance chamber for the harp. The sounding board 70 has a length extending from member 48, FIGURE 5, to the top end of block 46, which in a full size harp will approximate forty inches, substantially equal to that of the panels. The width of the sounding board 70 conforms to the spacing between the side panels except in the vicinity of the wing members 61 and 62 where the sounding board increases in width to eventually reach a maximum width adjacent the lower end of the box. As previously mentioned the sounding board is tapered longitudinally and which may range from a maximum thickness of one-half an inch to a minimum thickness of about one-sixteenth of an inch. The longitudinally extending ribs 71, FIGURES 8 and 9, have a tapering formation substantially equal to that of the board and the said ribs are secured to the underside of the board for almost its full length in order to tie the structure for vibrating action as a unit. Said action is further facilitated by the flat extent of the sounding board and by the additional width of the same adjacent the lower end which is made possible by the wing structures.

The sounding board and wing members are, of course, joined to one another either by means of screws or by gluing of the parts. The board is also secured directly to the side panels 53 and 54 for the upper half of the box and it will be observed that the board is spaced from the wing members by means of interposed spacing strips 72 and 73, respectively. The shape of each spacing strip conforms to the outline of its wing member, and each strip functions to maintain a spaced relation between the sounding board and the respective wing member. For adequately strengthening and reinforcing the board so that it will withstand the tension applied thereto by the strings, the said board is provided with the bridge 74 fixed to the underside of the board and by the top center strip 75 secured to the board on its top side. Both the bridge and strip extend longitudinally on approximately the center line for the complete length of the board. A plurality of openings 76 extend through the top center strip 75, board 70 and bridge 74, and it will be understood that these openings receive the strings which are knotted on the underside and in this manner the strings are conveniently anchored to the sounding board. The decorative appearance of the sounding box structure is enhanced and the same is completed by the top corner strip 77. Actually the said corner strip covers up the securing screws employed to unite the board to the spacing strip, wing members and panels. Also, for decorative purposes side cover strips 78 are provided and which extend along the perimeter of the sounding board in order to cover the end grain structure.

With the sounding board 70 under tension as it will be when the strings are tuned, it will be understood that the board is able to vibrate freely in response to the action of the strings. This vibrating movement of the board sets up pulsations of the air within the box and which are caused to emerge through the openings or ports 60. In forcing the pulsations to leave the box through the ports 60 the pulsations are retarded by precisely half a vibration and thus they emerge in exact phase relation with those produced by the top of the sounding board to augment the same. The shape of the present sounding box and the taper of the several parts are all designed to obtain maximum efficiency of vibration so that the resonance chamber will act to amplify and enrich all of the tones produced by the plurality of strings.

I claim:

1. In frame structure for a harp, the combination including a sounding box comprising a body shell and a sounding board, said body shell consisting of right and left side panels and a rear panel, said side and rear panels being flat throughout their entire length, said side panels each being connected along one side edge to the rear panel and being connected along their opposite side edge to the sounding board, whereby the side and rear panels and the sounding board form a longitudinal chamber approximately quadrilateral in cross section at all points along the length of the sounding box, said rear panel having a plurality of longitudinally elongated and spaced openings formed therein and which communicate with the chamber, a base for supporting the sounding box, a column also supported by the base and located in front of the sounding board, and neck structure connecting the column and the sounding box at the top end of said elements.

2. In frame structure for a harp, the combination including a sounding box comprising a body shell and a sounding board, said body shell consisting of right and left side panels and a rear panel, said side and rear panels being flat throughout their entire length, said side panels each being connected along one side edge to the rear panel and being connected along their opposite side edge to the sounding board, whereby the side and rear panels and the sounding board form a longitudinal chamber approximately quadrilateral in cross section at all points along the length of the sounding box, said sounding box tapering from a maximum cross sectional area at the bottom to a minimum at the top and said panels and also the sounding board tapering in thickenss and in width from a maximum at their bottom end to a minimum at the top end, a bridge secured to the underside of the sounding board and extending on the longitudinal center line of the same, a top center strip also secured to the sounding board on the top side and which extends on the longitudinal center line of the board, a base member secured to the sounding box at its bottom end for supporting the said box, a column also supported by the base member and located in front of the sounding board, and neck structure connecting the column and the sounding box at the top end of said elements.

3. In frame structure for a harp, the combination with a sounding box including a body shell and a sounding board, said body shell consisting of a pair of longitudinal side panels connected along their rear edges by a longitudinal rear panel of equal length whereby the side panels are maintained in spaced relation, said panels being flat throughout their entire length, a pair of wing members fixed to the side panels respectively and extending laterally on respective sides of the body shell from the bottom end to approximately a midposition in relation to the length of the box, said sounding board being secured to the front of the side panels and to the wing members to form a longitudinal chamber with said elements and which approximately quadrilateral in cross section at all points along tis length, a base member secured to the sounding box at its bottom end for supporting the said box, a column also supported by the base member and located in front of the sounding board, neck structure connecting the column and the sounding box at the top end of said elements, and said rear panel having a plurality of openings therein elongated in the direction of the length of the panel and spaced longitudinally of the panel and communicating with the chamber.

4. In frame structure for a harp, the combination including a body shell and a sounding board to provide a sounding box for the harp, said body shell consisting of a pair of longitudinal side panels connected along their rear edges by a longitudinal rear panel of equal length whereby the side panels are maintained in spaced relation, said panels being flat throughout their length, a wing member fixed to each side panel along the front edge of the same and projecting laterally, each wing member extending from the bottom end of the body shell to approximately a midposition in the length of the box, said sounding board being secured directly to the front edges of the side panels and being secured to the wing members along the outer edge of the members in a manner to space the sounding board from the wing members, whereby the panels, wing members and sounding board form a longitudinal chamber which is quadrilateral in cross section at all points along its length except where the chamber is enlarged in area by the wing members, a base member secured to the sounding box at its bottom end for supporting the said box, a column also supported by the base member and located in front of the sounding board, neck structure connecting the column and the sounding box at the top end of said elements, and said rear panel having a plurality of openings therein spaced longitudinally of the panel and communicating with the chamber.

5. Frame structure for a harp as defined by claim 4, wherein the sounding box tapers from a maximum cross sectional area at the bottom end to a minimum cross sectional area at the top end, and wherein the side panels, the rear panel and the sounding board also taper in width and in thickenss from a maximum at the bottom end to a minimum at the top end.

6. Frame structure for a harp as defined by claim 4, wherein the sounding box tapers from a maximum cross- sectional area at the bottom end to a minimum cross sectional area at the top end, wherein the side panels, the rear panel and the sounding board also taper in width and in thickness from a maximum at the bottom end to a minimum at the top end, and additionally including a bridge on the underside of the sounding board and a center strip on the top side, both bridge and center strip extending longitudinally on the center line for the full length of the sounding board.

7. Sounding box structure for a harp, in combination, a body shell of tapering formation in a longitudinal direction, said body shell comprising a rear panel having a plurality of open ports longitudinally elongated and spaced along the length of the panel, and a side panel secured to the rear panel at each side thereof and extending forwardly, said panels being flat throughout their entire length, a sounding board secured to the front edges of the side panels for their entire length, whereby the body shell and the sounding board provide a chamber of quadrilateral shape in cross section at all points along its length, a body frame at the bottom end of the largest area for uniting the panels and sounding board, and a block at the top end of smallest area for also uniting the panels and sounding board, said panels and sounding board tapering in thickness from a maximum at the bottom end of the parts to a minimum thickness at the top end.

8. Sounding box structure for a harp as defined by claim 7, additionally including a bridge secured to the underside of the sounding board and a center strip secured to the top side, said bridge and strip extending on the longitudinal center line of the board for its complete length.

9. Sounding box structure for a harp as defined by claim 7, additionally including reinforcing ribs secured to the inside of the rear panel and extending transversely of the panel between the port openings.

References Cited in the file of this patent

UNITED STATES PATENTS

| | | |
|---|---|---|
| 538,038 | Durkee | Apr. 23, 1895 |
| 666,016 | Lehman | Jan. 15, 1901 |
| 1,817,951 | Starke | Aug. 11, 1931 |